United States Patent
Sung et al.

(10) Patent No.: US 9,875,551 B2
(45) Date of Patent: Jan. 23, 2018

(54) METHOD FOR PERFORMING USER AUTHENTICATION AND ELECTRONIC DEVICE THEREOF

(71) Applicant: Samsung Electronics Co., Ltd., Gyeonggi-do (KR)

(72) Inventors: Woon-Tahk Sung, Seoul (KR); Young-Kwon Yoon, Seoul (KR); Ki-Huk Lee, Gyeonggi-do (KR); Taek-Seong Jeong, Gyeonggi-do (KR); Moon-Soo Kim, Seoul (KR); Tae-Ho Kim, Chungcheongbuk-do (KR)

(73) Assignee: Samsung Electronics Co., Ltd (KR)

( * ) Notice: Subject to any disclaimer, the term of this patent is extended or adjusted under 35 U.S.C. 154(b) by 21 days.

(21) Appl. No.: 14/864,363

(22) Filed: Sep. 24, 2015

(65) Prior Publication Data
US 2016/0088241 A1    Mar. 24, 2016

(30) Foreign Application Priority Data
Sep. 24, 2014   (KR) .................. 10-2014-0127699

(51) Int. Cl.
| G06K 9/20 | (2006.01) |
| G06T 7/20 | (2017.01) |
| H04N 5/235 | (2006.01) |
| G06K 9/00 | (2006.01) |

(52) U.S. Cl.
CPC ............ G06T 7/20 (2013.01); G06K 9/00604 (2013.01); G06K 9/2027 (2013.01); H04N 5/2354 (2013.01); G03B 2215/0596 (2013.01)

(58) Field of Classification Search
CPC .... G06T 7/20; G06K 9/2027; G06K 9/00604; H04N 5/2354; G03B 2215/0596
USPC ......................................................... 382/117
See application file for complete search history.

(56) References Cited

U.S. PATENT DOCUMENTS

| 6,583,812 | B1* | 6/2003 | Yamazaki | ............ H04N 5/2354 |
| | | | | 348/131 |
| 2006/0274918 | A1 | 12/2006 | Amantea et al. | |
| 2008/0277601 | A1 | 11/2008 | Phinney et al. | |
| 2009/0232418 | A1* | 9/2009 | Lolacono | ............ G06K 9/2027 |
| | | | | 382/312 |
| 2010/0074478 | A1* | 3/2010 | Hoyos | ................ G06K 9/00604 |
| | | | | 382/117 |
| 2013/0182915 | A1* | 7/2013 | Hanna | .................... A61B 5/117 |
| | | | | 382/116 |
| 2015/0062413 | A1* | 3/2015 | Yokoya | ................ H04N 5/2354 |
| | | | | 348/363 |

* cited by examiner

*Primary Examiner* — Jon Chang
(74) *Attorney, Agent, or Firm* — The Farrell Law Firm, P.C.

(57) ABSTRACT

Disclosed are a method and an electronic device for performing user authentication, the method including detecting a subject, determining a light-emitting parameter of a light source when the subject is to be photographed, and acquiring an image of the subject based on the determined light-emitting parameter.

18 Claims, 11 Drawing Sheets

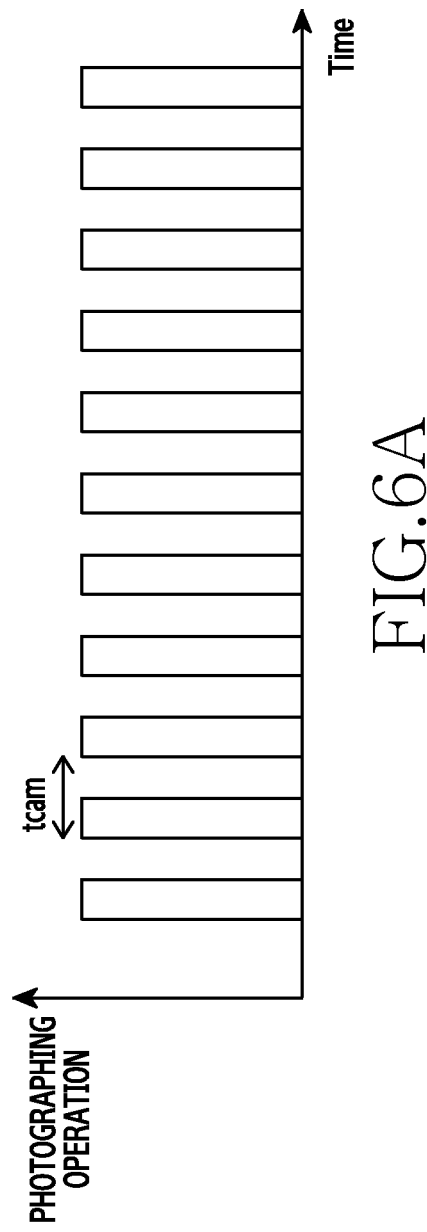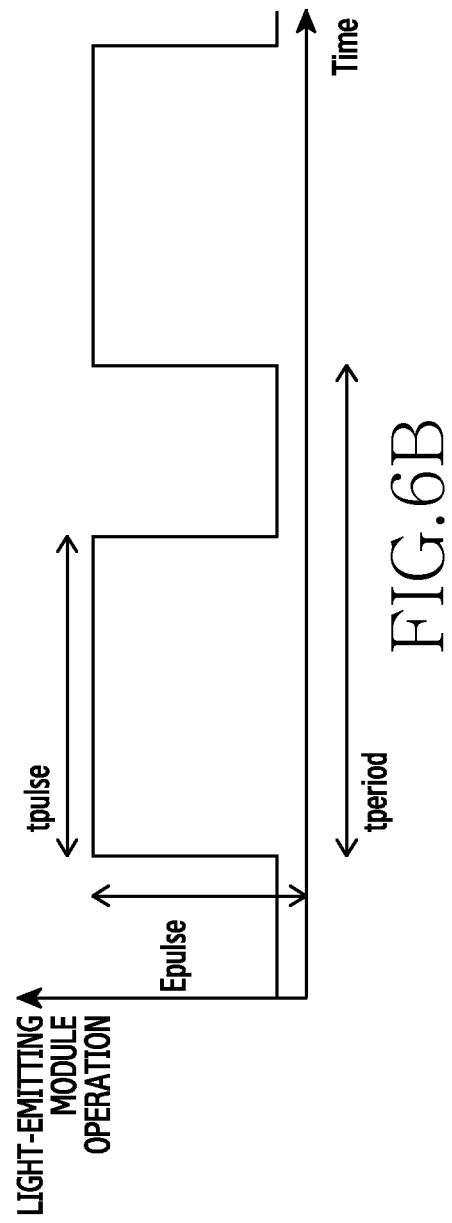

METHOD FOR PERFORMING USER AUTHENTICATION AND ELECTRONIC DEVICE THEREOF

PRIORITY

This application claims priority under 35 U.S.C. § 119(a) to Korean Application Serial No. 10-2014-0127699, which was filed in the Korean Intellectual Property Office on Sep. 24, 2014, the contents of which are incorporated herein by reference.

BACKGROUND OF THE INVENTION

1. Field of the Invention

The present invention relates to a method and electronic device for performing user authentication.

2. Description of the Related Art

Wireless communication technology has evolved to where various functions can be performed by one electronic device. For example, in addition to performing a telephone call or transmitting and receiving a text message, current electronic devices may also execute various contents and games, and store various pieces of important user information by accessing a web browser.

Therefore, important user information is being stored in the electronic device, resulting in the need for a method of performing a user authentication by easily photographing a body part of a user.

Since an electronic device exceeds a configured safety standard when a user's body part is photographed in order to perform a user authentication in the electronic device in the conventional art, user safety has been jeopardized.

For example, when a user's eyeball is photographed to perform the user authentication in the conventional electronic device, a configured light source is irradiated without considering a surrounding environment or a state of the electronic device, thus jeopardizing a user's safety. Accordingly, there is a need in the art for a safety-ensured manner of photographing the user.

SUMMARY OF THE INVENTION

The present invention has been made to address the above-mentioned problems and disadvantages, and to provide at least the advantages described below.

Accordingly, an aspect of the present invention provides a light-emitting parameter of a light source which meets the configured safety standard when a subject is desired to be photographed, thereby ensuring the user's safety.

According to another aspect of the present invention, a user authentication method and device for ensuring a user's safety are provided since an image of a subject may be acquired by considering a light-emitting parameter such as a distance to the subject, light-emitting intensity, a light-emitting time interval, the amount of light-emitting instances, a motion degree, and an exposure time interval of a camera module.

According to another aspect of the present invention, a simplified user authentication device for ensuring a user's safety is provided, thereby also ensuring economical efficiency by reducing a package volume for the device.

According to an aspect of embodiments of the present invention, a method includes detecting a subject, determining a light-emitting parameter of a light source when the subject is to be photographed, and acquiring an image of the subject based on the determined light-emitting parameter.

According to another aspect of embodiments of the present invention, an electronic device includes a processor that determines a light-emitting parameter of a light source when a subject is to be photographed, and a camera module that acquires an image of the subject based on the determined light-emitting parameter.

BRIEF DESCRIPTION OF THE DRAWINGS

The above and other aspects, features, and advantages of the present disclosure will be more apparent from the following detailed description taken in conjunction with the accompanying drawings, in which:

FIGS. 6A and 6B illustrate operation relationships between photographing and a light-emitting module operation according to embodiments of the present invention;

DETAILED DESCRIPTION OF EMBODIMENTS OF THE INVENTION

Figure 1:
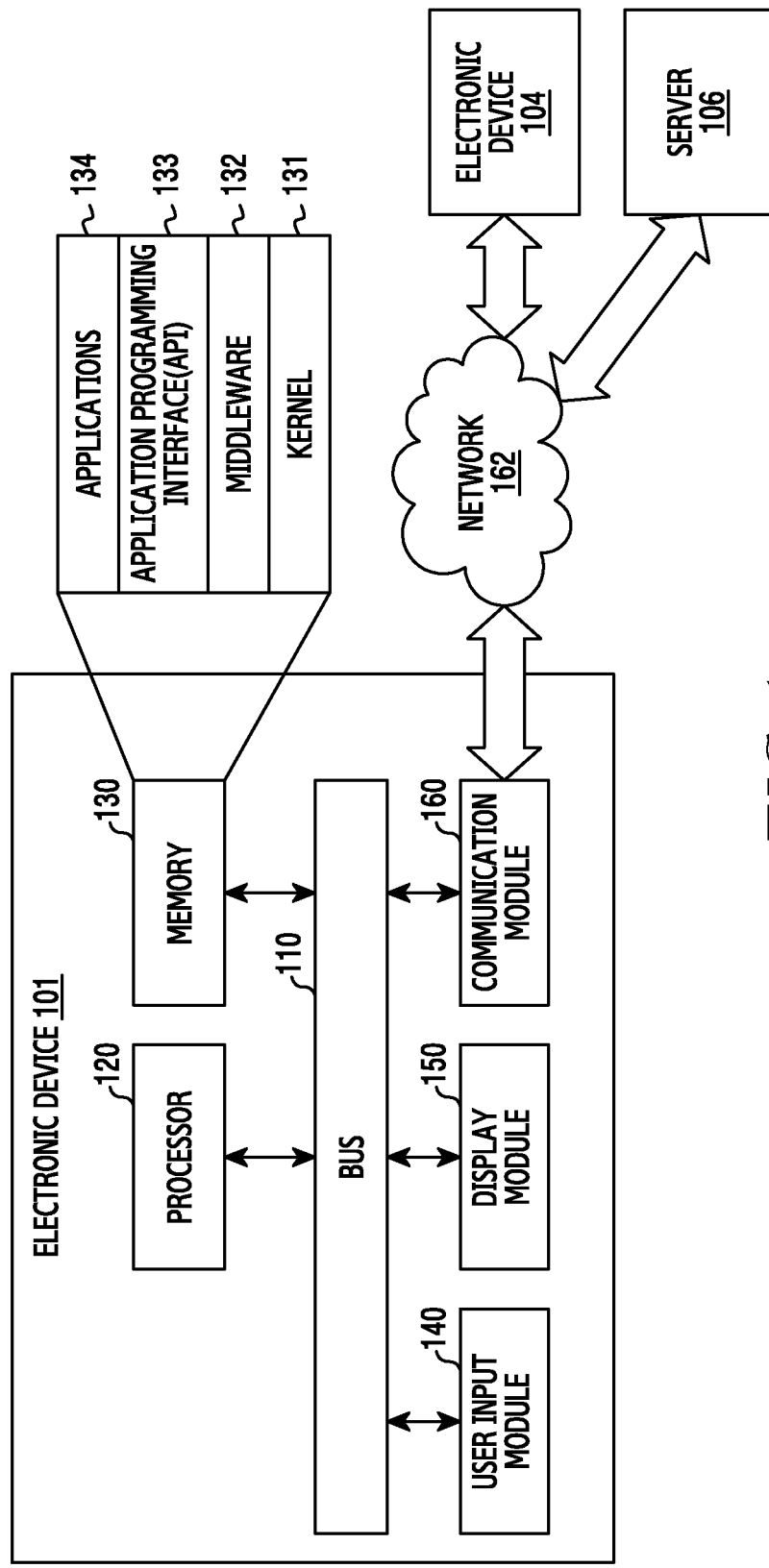
FIG. 1 illustrates a network environment including an electronic device 100 according to embodiments of the present invention.

Embodiments of the present invention are described with reference to the accompanying drawings. While these embodiments can be modified and have alternative forms, embodiments herein are shown by way of example in the drawings and will herein be described in detail. Thus, it should be apparent to those skilled in the art that various changes and modifications of the embodiments described herein can be made without departing from the scope and spirit of the present invention. In addition, descriptions of well-known functions and constructions are omitted for clarity and conciseness. In the following description the same or similar reference numerals may be used to refer to the same or similar elements.

The expressions "include" and "may include" used in embodiments of the present invention are intended to indicate a presence of a corresponding function, operation, or constitutional element disclosed herein, and are not intended to limit a presence of one or more functions, operations, or constitutional elements. In addition, the terms "include" and "have" are intended to indicate the existence of characteristics, numbers, steps, operations, constitutional elements, and elements disclosed in the specification or combinations thereof, and should be understood to indicate that there are additional possibilities of one or more other characteristics, numbers, steps, operations, constitutional elements, elements or combinations thereof.

In embodiments of the present invention, an expression "or" includes any and all combinations of words enumerated together. For example, "A or B" includes A or B, or includes both of A and B.

Although expressions used in embodiments of the present invention such as "$1^{st}$", "$2^{nd}$", "first", "second" may be used to express various constitutional elements of the embodiments, these expressions are not intended to limit the corresponding constitutional elements. For example, the above expressions are not intended to limit an order or an importance of the corresponding constitutional elements. The above expressions may be used to distinguish one constitutional element from another constitutional element. For example, a $1^{st}$ user device and the $2^{nd}$ user device are both user devices, and indicate different user devices, a $1^{st}$ constitutional element may be referred to as a $2^{nd}$ constitutional element, and similarly, the $2^{nd}$ constitutional element may be referred to as the $1^{st}$ constitutional element without departing from the scope of the embodiments of the present invention.

When a constitutional element is mentioned as being "connected" to or "accessing" another constitutional element, this indicates that the element is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

The term "substantially" typically indicates that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The terminology used in describing embodiments of the present disclosure is for the purpose of describing particular embodiments only and is not intended to be limiting of the embodiments of the present invention. A singular expression includes a plural expression unless there is a contextually distinctive difference therebetween.

Unless otherwise defined, all terms (including technical and scientific terms) used herein have the same meaning as commonly understood by those ordinarily skilled in the art to which embodiments of the present disclosure belong. It will be further understood that terms, such as those defined in commonly used dictionaries, should be interpreted as having a meaning that is consistent with their meaning in the context of the relevant art and the embodiments of the present disclosure, and are not to be interpreted in an idealized or overly formal sense unless expressly so defined herein.

An electronic device according to embodiments of the present invention may include an antenna capable of performing a communication function in at least one frequency band. For example, the electronic device may be a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a MPEG-1 Audio Layer 3 (MP3) player, a mobile medical device, a camera, and a wearable Head-Mounted-Device (HMD) such as electronic glasses, electronic clothes, an electronic bracelet, an electronic necklace, an electronic appcessory, an electronic tattoo, or a smart watch.

According to certain embodiments, the electronic device may be a smart home appliance having an antenna, such as at least one of a TeleVision (TV), a Digital Video Disk (DVD) player, an audio, a refrigerator, an air conditioner, a cleaner, an oven, a microwave oven, a washing machine, an air purifier, a set-top box, a TV box such as Samsung HomeSync™, Apple TV™, or Google TV™, a game console, an electronic dictionary, an electronic key, a camcorder, and an electronic picture frame.

According to certain embodiments, the electronic device including the antenna may be one of various medical devices such as Magnetic Resonance Angiography (MRA), Magnetic Resonance Imaging (MRI), Computed Tomography (CT), imaging equipment, and ultrasonic instrument, a navigation device, a Global Positioning System (GPS) receiver, an Event Data Recorder (EDR), a Flight Data Recorder (FDR), a car infotainment device, an electronic equipment for ship such as a vessel navigation device, or a gyro compass, avionics, a security device, a car head unit, an industrial or domestic robot, an Automatic Teller's Machine (ATM), and Point Of Sales (POS) devices.

According to certain embodiments, the electronic device may be part of at least one of an item of furniture or a building/structure including an antenna. The electronic device may be an electronic board, an electronic signature input device, a projector, or any of various measurement machines such as water supply, electricity, gas, and a propagation measurement machine. The electronic device may be one or more combinations of the aforementioned various devices, may be a flexible device, and is not limited to the aforementioned devices.

The term 'user' used in embodiments of the present invention may refer to a person who uses the electronic device or a device which uses the electronic device, such as an Artificial Intelligence (AI) electronic device.

FIG. 1 illustrates a network environment 100 including an electronic device 101 according to embodiments of the present invention. Electronic device 101 includes a bus 110, a processor 120, a memory 130, an input/output interface 140, a display 150, and a communication module 160.

The bus 110 is a circuit for connecting the aforementioned constitutional elements to each other and for delivering a control message between the aforementioned constitutional elements.

The processor 120 receives an instruction from one or more of the aforementioned elements connected thereto, and thus interprets the received instruction and executes arithmetic or data processing according to the interpreted instruction.

The memory 130 stores an instruction or data received from or generated by the processor 120 or the different constitutional elements. The memory 130 includes programming modules such as a kernel 131, a middleware 132, an Application Programming Interface (API) 133, and applications 134. Each of the aforementioned programming modules may include software, firmware, or hardware entities or may include at least two or more combinations thereof.

The kernel 131 controls or manages the remaining programming modules, such as the bus 110, processor 120, and memory 130, used to execute an operation or function implemented in the middleware 132, the API 133, or the applications 134. In addition, the kernel 131 provides a controllable or manageable interface by accessing individual constitutional elements of the electronic device 101 in the middleware 132, the API 133, or the applications 134.

The middleware 132 performs a mediation role so that the API 133 or the applications 134 communicates with the kernel 131 to exchange data. In addition, regarding task requests received from the applications 134, for example, the middleware 132 performs a control such as scheduling or load balancing, for the task requests by using a method of assigning a priority capable of using a system resource of the electronic device 101 to at least one of the applications 134.

The API 133 includes at least one interface or function for file control, window control, video processing, and character control, for example, as an interface capable of controlling a function provided by the applications 134 in the kernel 131 or the middleware 132.

The applications 134 include, for example, Short Message Service (SMS)/Multimedia Messaging Service (MMS), e-mail, calendar, alarm, health care applications such as for measuring a physical activity level or blood sugar, or an environment information application such as atmospheric pressure, humidity, or temperature information. Additionally or alternatively, the applications 134 may be related to an information exchange between the electronic device 101 and an external electronic device such as an electronic device 104 or server 106. The application related to the information exchange includes, for example, a notification relay application for relaying specific information to the external electronic device or a device management application for managing the external electronic device.

For example, the notification relay application includes a function of relaying notification information generated in another application of the electronic device 101 to the external electronic device. Additionally or alternatively, the notification relay application receives notification information from the external electronic device and provides the notification information to the user. The device management application manages, for example, a function for at least one part of the external electronic device which communicates with the electronic device 101. Examples of the function include turning on/turning off all or part of the external electronic device or adjusting of a display illumination, and managing (e.g., installing, deleting, or updating) an application which operates in the external electronic device or a service provided by the external electronic device.

The applications 134 includes an application specified according to attribute information, such as an electronic device type of the external electronic device. For example, if the external electronic device is an MP3 player, the applications 134 include an application related to a music play. Similarly, if the external electronic device is a mobile medical device, the applications 134 include an application related to health care. The applications 134 include at least one of a specified application in the electronic device 101 or an application received from the external electronic device.

The input/output interface 140 relays an instruction or data input from a user by using a sensor, such as an acceleration or gyro sensor, or an input device, such as a keyboard or a touch screen, to the processor 120, the memory 130, or the communication module 160, for example, via the bus 110. For example, the input/output interface 140 provides data regarding a user's touch input via the touch screen to the processor 120, and outputs an instruction or data received from the processor 120, the memory 130, or the communication module 160 to an output device, such as a speaker or a display, via the bus 110. The input/output interface 140 outputs audio data provided by using the processor 120 to the user via the speaker.

The display 150 displays a variety of data to the user.

The communication module 160 connects a communication between the electronic device 101 and an external device, such as the electronic device 104 or the server 106. The communication module 160 includes an antenna 230, examples of which are described hereinafter. For example, the communication module 160 communicates with the external device by being connected with a network 162 through wireless or wired communication. The wireless communication includes, for example, at least one of Wireless Fidelity (Wi-Fi), Bluetooth® (BT), Near Field Communication (NFC), Global Positioning System (GPS), and cellular communication, such as Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile communication (GSM). The wired communication includes, for example, at least one of Universal Serial Bus (USB), High Definition Multimedia Interface (HDMI), Recommended Standard (RS)-232, and Plain Old Telephone Service (POTS).

The network 162 may be a telecommunications network including at least one of a computer network, Internet, Internet of Things, and a telephone network. A protocol, such as a transport layer, data link layer or physical layer protocol, for communication between the electronic device 101 and an external device, may be supported in at least one of the applications 134, the application programming interface 133, the middleware 132, the kernel 131, and the communication module 160.

Figure 2:
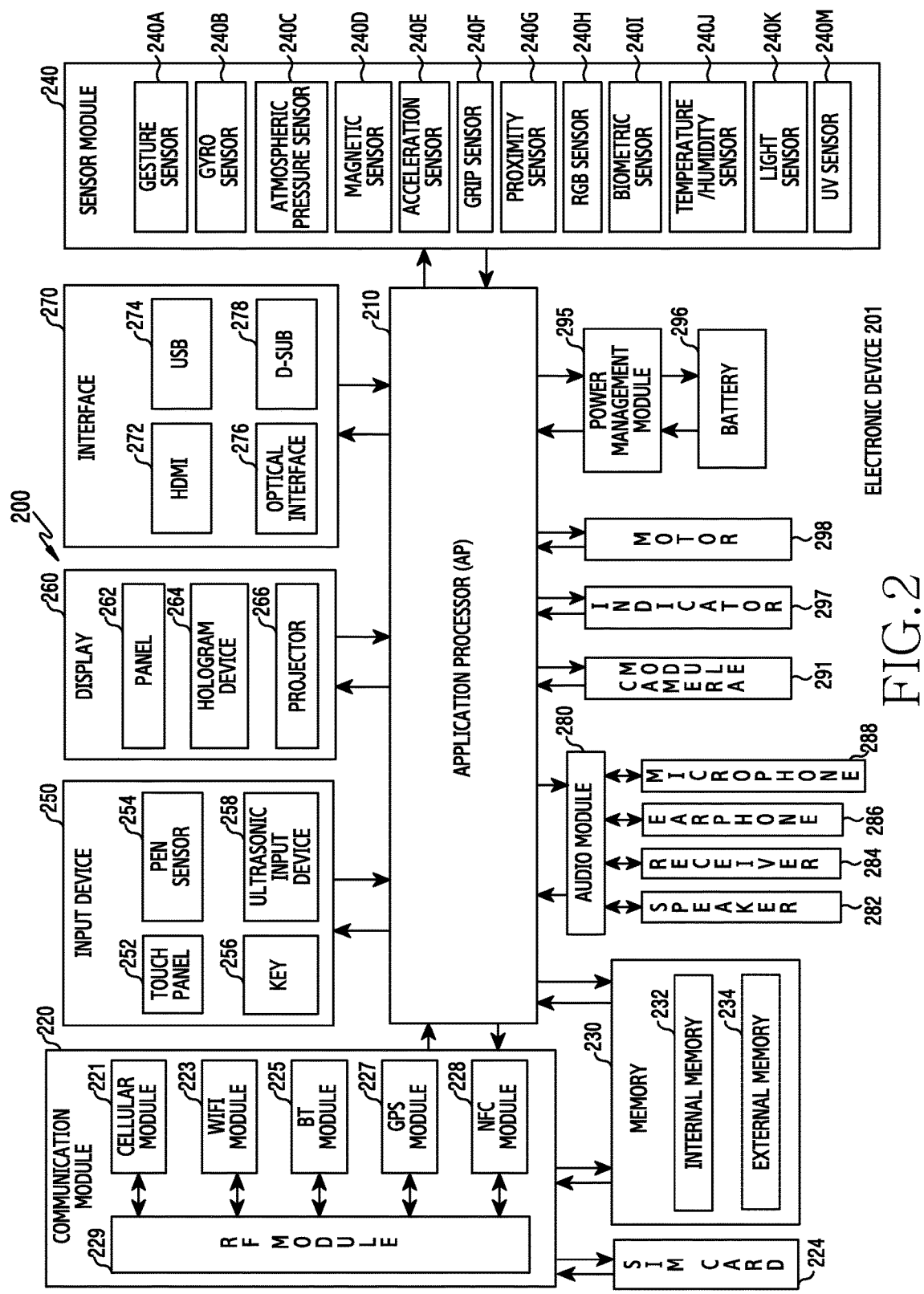
FIG. 2 illustrates a block diagram of an electronic device according to embodiments of the present invention.

FIG. 2 illustrates a block diagram 200 of an electronic device 201 according to embodiments of the present invention.

As shown in FIG. 2, the electronic device 201 includes at least one Application Processor (AP) 210, communication module 220, Subscriber Identification Module (SIM) card 224, memory 230, sensor module 240, input device 250, display 260, interface 270, audio module 280, camera module 291, power management module 295, battery 296, indicator 297, and motor 298.

The AP 210 controls a plurality of hardware or software constitutional elements connected to the AP 210 by driving an operating system or an application program, processes a variety of data including multimedia data, and performs an arithmetic operation. The AP 210 is implemented, for example, with a System on Chip (SoC), and may further include a Graphic Processing Unit (GPU).

The communication module 220 performs data transmission/reception in communication between other electronic devices connected with the electronic device 201 through a network, and includes a cellular module 221, a Wi-Fi module 223, a BT module 225, a Global Positioning System (GPS) module 227, a Near Field Communication (NFC) module 228, and a Radio Frequency (RF) module 229.

The cellular module 221 provides such services as a voice call, video call, text service and Internet service, through a communication network, identifies and authenticates the electronic device within the communication network by using the SIM card 224, and performs at least some of functions that can be provided by the AP 210, such as multimedia control functions.

The cellular module 221 includes a Communication Processor (CP) and is implemented, for example, with an SoC. Although constitutional elements such as the cellular module 221, the memory 230, and the power management module 295 are illustrated as separate constitutional elements with respect to the AP 210 in FIG. 2, the AP 210 may also be implemented such that at least one element of the aforementioned constitutional elements is included.

The AP 210 or the cellular module 221 loads an instruction or data, which is received from each non-volatile memory connected thereto or at least one of different constitutional elements, to a volatile memory and processes the instruction or data. In addition, the AP 210 or the cellular module 221 stores data, which is received from at least one of different constitutional elements or generated by at least one of different constitutional elements, into the non-volatile memory.

Each of the WiFi module 223, the BT module 225, the GPS module 227, and the NFC module 228 includes, for example, a processor for processing data transmitted/received through a corresponding module. Although the cellular module 221, the WiFi module 223, the BT module 225, the GPS module 227, and the NFC module 228 are illustrated in FIG. 2 as separate blocks, according to an embodiment, at least some two of these modules may be included in one Integrated Chip (IC) or IC package. For example, a communication processor corresponding to the cellular module 221 and a WiFi processor corresponding to the WiFi module 223 may be implemented with an SoC.

The RF module 229 serves to transmit/receive data, such as an RF signal. Although not shown, the RF module 229 includes, for example, a transceiver, a Power Amp Module (PAM), a frequency filter, and a Low Noise Amplifier (LNA), and may further include a component for transmitting/receiving a radio wave on a free space in wireless communication, such as a conductor or a conducting wire. Although it is illustrated in FIG. 2 that the cellular module 221, the WiFi module 223, the BT module 225, the GPS module 227, and the NFC module 228 share one RF module 229, according to one embodiment, at least one of these modules may transmit/receive an RF signal via a separate RF module.

The SIM card 224 may be inserted to a slot formed at a specific location of the electronic device, and includes unique identification information, such as an Integrated Circuit Card IDentifier (ICCID) or subscriber information, such as an International Mobile Subscriber Identity (IMSI).

The memory 230 includes an internal memory 232 and an external memory 234. The internal memory 232 includes, for example, at least one of a volatile memory, such as a Dynamic RAM (DRAM), a Static RAM (SRAM), and a Synchronous Dynamic RAM (SDRAM) and a non-volatile memory, such as a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, and a NOR flash memory.

The internal memory 232 may include a Solid State Drive (SSD), a flash drive, Compact Flash (CF), Secure Digital (SD), Micro Secure Digital (Micro-SD), Mini Secure digital (Mini-SD), extreme Digital (xD), and memory stick, for example. The external memory 234 may be operatively coupled to the electronic device 201 via various interfaces. The electronic device 201 may further include a storage unit such as a hard drive.

The sensor module 240 measures a physical quantity or detects an operation state of the electronic device 201, and thus converts the measured or detected information into an electric signal. The sensor module 240 includes, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illumination sensor 240K, and an Ultra Violet (UV) sensor 240M. Additionally or alternatively, the sensor module 240 may include, for example, an E-node sensor, an ElectroMyoGraphy (EMG) sensor, an ElectroEncephaloGram (EEG) sensor, an ElectroCardioGram (ECG) sensor, and a fingerprint sensor, and may further include a control circuit for controlling at least one or more sensors included therein.

The input device 250 includes a touch panel 252, a (digital) pen sensor 254, a key 256, and an ultrasonic input device 258. The touch panel 252 recognizes a touch input, for example, by using at least one of an electrostatic type, a pressure-sensitive type, and an ultrasonic type. The touch panel 252 further includes a control circuit. When using the electrostatic type, physical contact and proximity recognition may be performed, and when using a tactile layer, the touch panel 252 provides the user with a tactile reaction.

The (digital) pen sensor 254 may be implemented, for example, by using the same or similar method of receiving a touch input of the user or by using an additional sheet for recognition. The key 256 may be, for example, a physical button, an optical key, a keypad, or a touch key. The ultrasonic input device 258 is used by the electronic device 201 to detect a sound wave through a microphone 288 by using a pen which generates an ultrasonic signal, and is capable of radio recognition. The electronic device 201 uses the communication module 220 to receive a user input from an external device connected thereto.

The display 260 includes a panel 262, a hologram 264, and a projector 266. The panel 262 may be, for example, a Liquid-Crystal Display (LCD) or an Active-Matrix Organic Light-Emitting Diode (AM-OLED), may be implemented in a flexible, transparent, or wearable manner, and may be constructed as one module with the touch panel 252. The hologram 264 uses an interference of light and displays a stereoscopic image in the air. The projector 266 displays an image by projecting a light beam onto a screen located inside or outside the electronic device 201. The display 260 further includes a control circuit for controlling the panel 262, the hologram 264, and the projector 266.

The interface 270 includes a High-Definition Multimedia Interface (HDMI) 272, a Universal Serial Bus (USB) 274, an optical communication module 276, and a D-subminiature (D-sub) 278. The interface 270 may be included, for example, in the communication module 160 of FIG. 1. Additionally or alternatively, the interface 270 includes Mobile High-definition Link (MHL), Secure Digital (SD)/Multi-Media Card (MMC) or Infrared Data Association (IrDA).

The audio module 280 bilaterally converts a sound and electric signal. At least some constitutional elements of the audio module 280 may be included in, for example, the input/output interface 140 of FIG. 1. The audio module 280 converts sound information which is input or output, for example, through a speaker 282, a receiver 284, an earphone 286, and the microphone 288.

The camera module 291 is a device for image and video capturing, and according to one embodiment, includes one or more image sensors (a lens, an Image Signal Processor (ISP), and a flash, such as an LED or xenon lamp.

The power management module 295 manages power of the electronic device 201 and includes, for example, a Power Management Integrated Circuit (PMIC), a charger IC, or a battery gauge.

The PMIC may be placed, for example, inside an IC or SoC semiconductor. Charging is classified into wired and wireless charging. The charger IC charges a battery, and prevents an over-voltage or over-current flow from a charger. The charger IC may be for at least one of the wired and the wireless charging. The wireless charging may be classified, for example, into a magnetic resonance, magnetic induction, and electromagnetic type. An additional circuit for the wireless charging may be provided, such as a coil loop, a resonant circuit, or a rectifier.

The battery gauge measures, for example, a residual quantity of the battery 296 and a voltage, current, and temperature during charging. The battery 296 stores or generates electricity, and supplies power to the electronic device 201 by using the stored or generated electricity. For example, the battery 296 includes a rechargeable battery or a solar battery.

The indicator 297 indicates a specific state, such as a booting, message, or charging state, of part or all of the electronic device 201. The motor 298 converts an electric signal into a mechanical vibration. Although not shown, the electronic device 201 includes a processing unit for supporting mobile TV, which processing unit processes media data according to a protocol of, for example, Digital Multimedia Broadcasting (DMB), Digital Video Broadcasting (DVB), and media flow.

Each of the aforementioned constitutional elements of the electronic device according to embodiments of the present invention may include one or more components, and names thereof may vary depending on a type of electronic device. The electronic device according to embodiments of the present invention includes at least one of the aforementioned constitutional elements. Some of the constitutional elements may be omitted, or additional other constitutional elements may be further included. In addition, some of the constitutional elements of the electronic device according to embodiments of the present invention may be combined and constructed as one entity, so as to equally perform functions of corresponding constitutional elements before combination.

The term "module" used in embodiments of the present document indicates a unit including, for example, one of hardware, software, and firmware or a combination of two or more of them. The "module" may be interchangeably used with a term such as a unit, a logic, a logical block, a component, and a circuit. The "module" may be a minimum unit of an integrally constituted component or may be a part thereof. The "module" may be a minimum unit for performing one or more functions or may be a part thereof The "module" may be mechanically or electrically implemented. For example, the "module" of the present invention includes at least one of an Application-Specific Integrated Circuit (ASIC) chip, a Field-Programmable Gate Arrays (FPGAs), and a programmable-logic device, which are known or will be developed and which perform certain operations.

According to embodiments, at least some parts of a device or operations according to embodiments of the present invention may be implemented with an instruction stored in a computer-readable storage media. If the instruction is executed by one or more processors, the one or more processors performs a function corresponding to the instruction. The computer-readable storage media may be, for example, the memory 230. At least some parts of the programming module may be implemented, for example, by the processor 210, and at least some parts of the programming module include modules, programs, routines, sets of instructions, and processes for performing one or more functions.

The computer readable recording medium may be a hardware device configured particularly to store and perform a program instruction, such as a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), and a flash memory. An example of the program instruction includes not only a machine language created by a compiler but also a high-level language executable by a computer by using an interpreter. The aforementioned hardware device may be configured to operate as one or more software modules to perform operations of the present invention, and vice-versa.

The module or programming module according to embodiments of the present invention may further include at least one constitutional element among the aforementioned constitutional elements, may omit some of them, or may further include additional other constitutional elements. Operations performed by a module, programming module, or other constitutional elements according to embodiments of the present invention may be executed in a sequential, parallel, repetitive, or heuristic manner. In addition, some of the operations may be executed in a different order or may be omitted, or other operations may be added.

Figure 3:
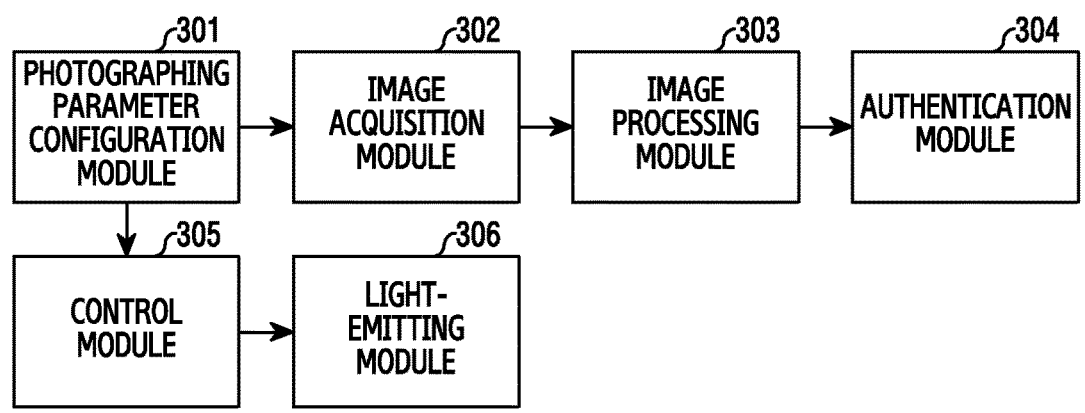
FIG. 3 illustrates a block diagram of an electronic device according to embodiments of the present invention.

FIG. 3 illustrates a block diagram of an electronic device according to embodiments of the present invention. According to FIG. 3, an electronic device includes a photographing parameter configuration module 301, an image acquisition module 302, an image processing module 303, an authentication module 304, a control module 305, and a light-emitting module 306.

The photographing parameter configuration module 301 configures a photographing parameter depending on a surrounding condition of the electronic device and a condition of a subject which is a photographing target. According to an embodiment, the photographing parameter configuration module 301 configures an exposure time interval and a photovoltaic efficiency of an image sensor which is a parameter for operating the image acquisition module 302.

The image acquisition module 302 causes a subject reflected by a light source to be photographed, and causes a user's iris reflected by light of a near-infrared ray irradiated by the light-emitting module 306 to be photographed.

The image processing module 303 processes an image acquired in the image acquisition module 302 to be suitable for authentication, and, in order to determine whether an iris image acquired in the image acquisition module 302 is identical to a user's iris image, processes the acquired iris image to be suitable for user authentication.

The authentication module 304 performs authentication using an image processed in the image processing module 303, such as determining whether an iris image processed to be suitable for the user authentication in the image processing module 303 is identical to a configured user's iris image.

The control module 305 controls an operation of the light-emitting module 306.

The light-emitting module 306 emits a light source to enable an image of a subject to be acquired in the image acquisition module 302, such as by emitting light of a near-infrared ray (from 750 nm to 950 nm).

When a subject to be photographed is or is to be detected, the electronic device includes a processor that determines a light-emitting parameter of the light source and a camera module which acquires an image of the subject based on the determined light-emitting parameter.

The light-emitting parameter may be determined according to at least one among a distance to the subject, light-emitting intensity, a light-emitting time interval, the number of times of light-emitting, a motion degree, and an exposure time interval of a camera module.

The processor determines the light-emitting parameter within a configured safety standard, as described below.

The processor increases a light-emitting intensity to a configured light-emitting intensity according to the configured safety standard when it is determined that the distance to a subject is within a range from a first distance to the second distance, and decreases the light-emitting intensity to the configured light-emitting intensity according to the safety standard when it is determined that the distance to the subject is within a predetermined threshold distance.

The processor increases a light-emitting intensity and a light-emitting time interval to a configured light-emitting intensity and a configured light-emitting time interval, respectively, when a second motion degree has been detected as a first motion degree, and decreases the light-emitting intensity and the light-emitting time interval to a configured light-emitting intensity and a configured light-emitting time interval, respectively, when the first motion degree has been detected in the second motion degree.

The processor increases a light-emitting intensity and a light-emitting time interval to a configured light-emitting intensity and a configured light-emitting time interval, respectively, when an exposure time interval of the camera module decreases as a configured time interval, when a second motion degree has been detected in a first motion degree, and decreases the light-emitting intensity and the light-emitting time interval to a configured light-emitting intensity and a configured light-emitting time interval, respectively, when an exposure time interval of the camera module decreases as a configured time interval, when the first motion degree has been detected in the second motion information.

The processor decreases the light-emitting intensity to the configured light-emitting intensity when a detected brightness is greater than or equal to a configured brightness, and increases the light-emitting intensity as a configured light-emitting intensity when the detected brightness is less than the configured brightness.

The processor controls a light-emitting time interval to be an image photographing period of two or more frames.

The subject includes an iris.

Figure 4:
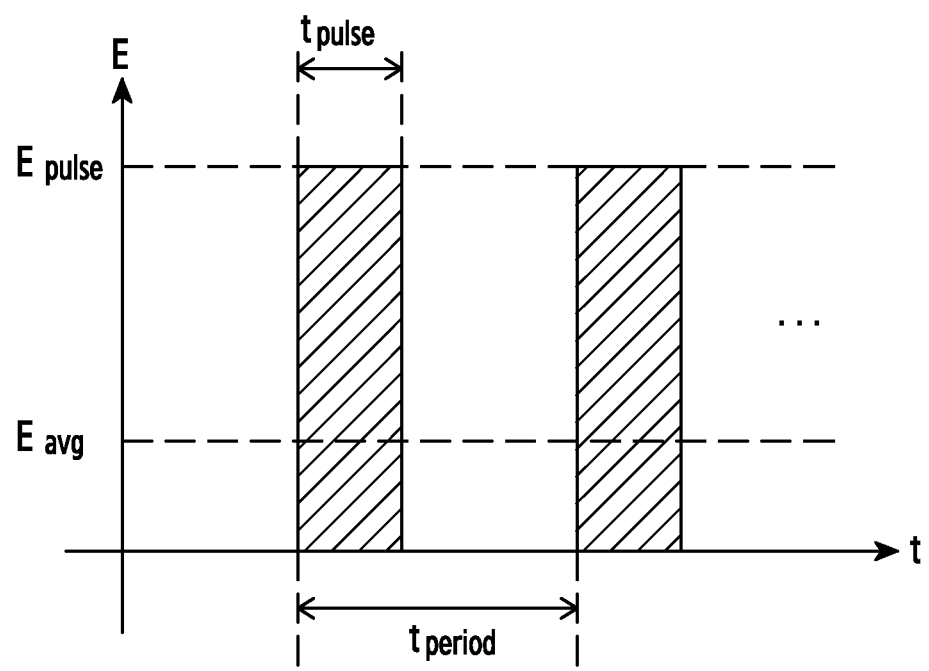
FIG. 4 illustrates a diagram of a safety standard of an infrared light source according to embodiments of the present invention.

FIG. 4 illustrates a diagram of a safety standard of an infrared light source according to embodiments of the present invention. According to various embodiments, when a subject to be photographed has been detected in an electronic device, the electronic device determines a light-emitting parameter (luminescence parameter) of a light source that acquires an image of the subject and then acquires the image of the subject based on the determined light-emitting parameter.

According to various embodiments, when the light-emitting parameter of the light source is determined in the electronic device, the electronic device determines a light-emitting parameter of the light source within a configured safety standard (safety limit). An average value of light-emitting energy is determined according to Equation (1) below and may not exceed the configured safety standard.

$$E_{avg} = E_{pulse}D = E_{pulse}\frac{t_{pulse}}{t_{period}} \tag{1}$$

In Equation (1), "Epulse" refers to a peak value of light-emitting energy, "D" refers to a duty cycle, "tpulse" refers to a light-emitting time interval, "tperiod" refers to a light-emitting period, and "D" may have a value between 0 and 1.

Equation 1 represents an average value (Eavg) of light-emitting energy of a light source emitting in the electronic device and represents the multiplication of the peak value (Epulse) of the light-emitting energy and the duty cycle. Herein, since the duty cycle is a value which divides the light-emitting time interval (tpulse) into the light-emitting period (tperiod), the average value (Eavg) of the light-emitting energy represents multiplication of the peak value (Epulse) of the light-emitting energy and the value which divides the light-emitting time interval (tpulse) into the light-emitting period (tperiod). Hereinafter, in order to clearly describe ]Equation 1, a graph shown in FIG. 4 will now be described.

In FIG. 4, the x-axis refers to a time interval axis (t), the y-axis refers to a light-emitting energy (E) of a light source, "Epulse" refers to a peak value of light-emitting energy emitting in the electronic device, "tpulse" refers to a light-emitting time interval emitting in the electronic device, and "tperiod" refers to a luminescence period which corresponds to a period from a time point after light is emitted during the time interval of "tpulse" to a time point before light is re-emitted during the time interval of "tpulse" in the electronic device.

According to various embodiments, "Eavg" in FIG. 4 refers to an average value of the light-emitting energy lightening in each a period of "tperiod" in an amount of the light-emitting energy of "Epulse" as the time interval of "tpulse". According to an embodiment, both the average value (Eavg) of the light-emitting energy and the peak value (Epulse) of the light-emitting energy should meet a safety standard configured in the electronic device.

Figure 5:
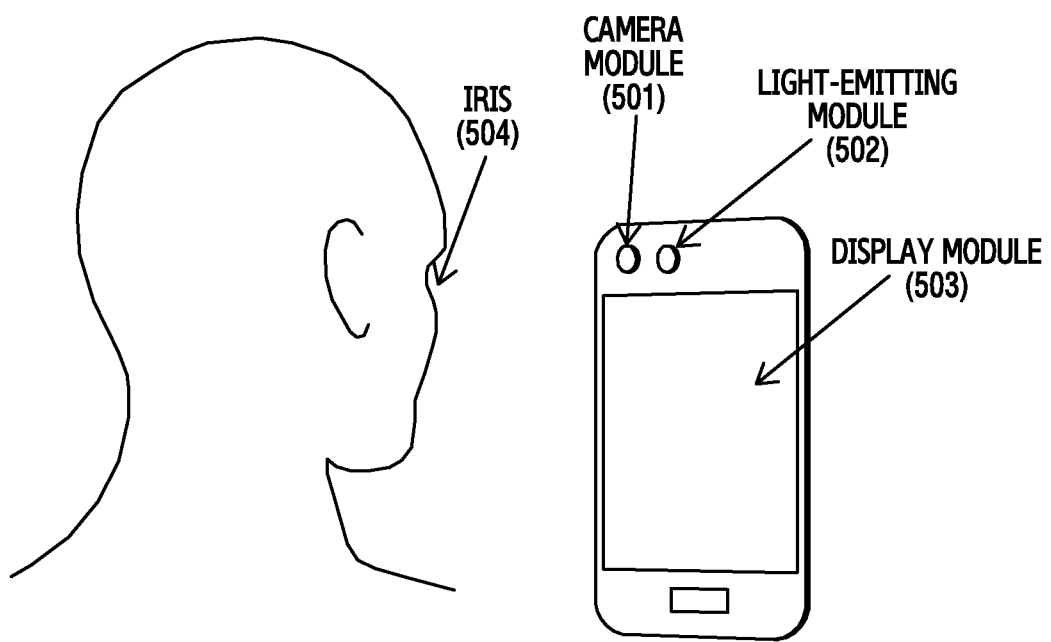
FIG. 5 illustrates an embodiment in which a subject is recognized, according to embodiments of the present invention.

FIG. 5 illustrates an embodiment in which a subject is recognized, according to embodiments of the present invention. As shown in FIG. 5, an electronic device includes a camera module 501, a light-emitting module 502, and a display module 503.

The camera module 501 acquires an image of a subject, and in FIG. 5, acquires an image of a user's iris 504. The camera module 501 includes an image processing module which processes an image acquired in the camera module 501 to be suitable for authentication and an authentication module which performs authentication using an image processed in the image processing module.

The light-emitting module 502 emits a light source to enable an image of the iris 504 to be acquired in the image acquisition module. According to embodiments, the light-emitting module 502 emits a light of near-infrared ray, and operates according to the light-emitting parameter of the light source determined in the electronic device. According to embodiments, the light-emitting parameter is determined according to at least one among a distance to the iris, light-emitting intensity, a light-emitting time interval, the number of light-emitting instances, a motion degree, an exposure time interval of a camera module, and within a safety standard configured in the electronic device.

According to various embodiments, the display module 503 displays an authentication request message and a photographing guide. When a user's iris image acquired in the electronic device is identical to a configured iris image, the display module 503 displays a guide message such as "a photographed iris image is identical to a configured iris image" and then releases a locking configuration of the electronic device. The display module 503 displays the photographing guide in order to photograph a user's iris 504 located within a configured distance.

FIGS. 6A and 6B illustrate operation relationships between photographing and a light-emitting module operation according to embodiments of the present invention. According to various embodiments, an operation of an emitting module included in an electronic device is determined according to a photographing operation.

FIG. 6A illustrates a graph representing a photographing operation of a camera module, according to embodiments of the present invention. As shown in FIG. 6A, a camera module included in an electronic device acquires an image of a subject according to a configured image acquisition period (team), by photographing the image in each exposure time interval of the camera module in the configured image acquisition period (team).

FIG. 6B is a graph representing an operation of a light-emitting module. The light-emitting module included in an electronic device may include various operations depending on a configured image acquisition period (team) of a camera module. According to an embodiment, a light-emitting time interval (tpulse) of the light-emitting module is n-times of the image acquisition period (team) of the camera module and begins light-emitting at any time during a photographing operation.

For example, as shown in FIGS. 6A and 6B, the light-emitting time interval (tpulse) of the light-emitting module is 4 times of the image acquisition period (team) and the camera module acquires an image of a subject (e.g., iris) illuminated by the light-emitting module, from three or more photographing results. According to an embodiment, intensity (Epulse) of a light source and average intensity (Eavg) of the light source may be less than or equal to a configured safety standard.

As shown in FIGS. 6A and 6B, an operation of the light-emitting module of the electronic device may be changed according to a photographing operation of the camera module. When the image acquisition period (team) of the camera module increases, the light-emitting time interval (tpulse) and the intensity (Epulse) of the light source decreases as a configured time interval and intensity. When the electronic device exceeds the safety standard configured for the electronic device, the electronic device adjusts the exceeded safety standard to be less than or equal to the configured safety standard by decreasing the light-emitting time interval (tpulse) and the intensity (Epulse) of the light source. According to an embodiment, the light-emitting time interval (tpulse) of the light-emitting module is determined as n multiples of the image acquisition period (tcam) of the camera module, is determined according to surrounding illumination, and is determined according to whether a place where a current user is located is indoors or outdoors.

Figure 7A:
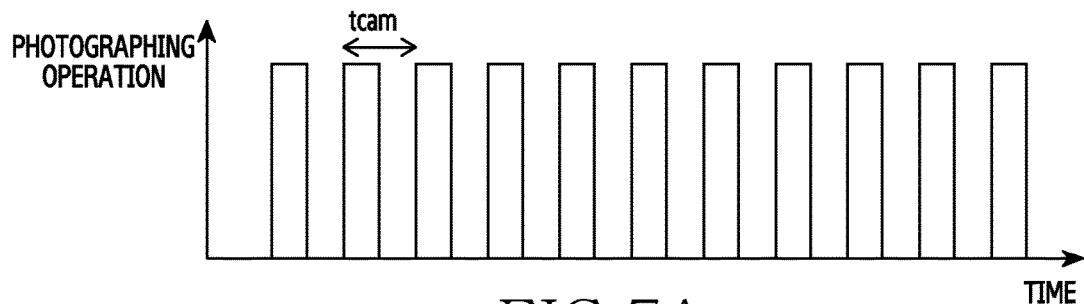
FIGS. 7A, 7B and 7C illustrate operations of a light-emitting module depending on a distance of a subject according to embodiments of the present invention.
Figure 7B:
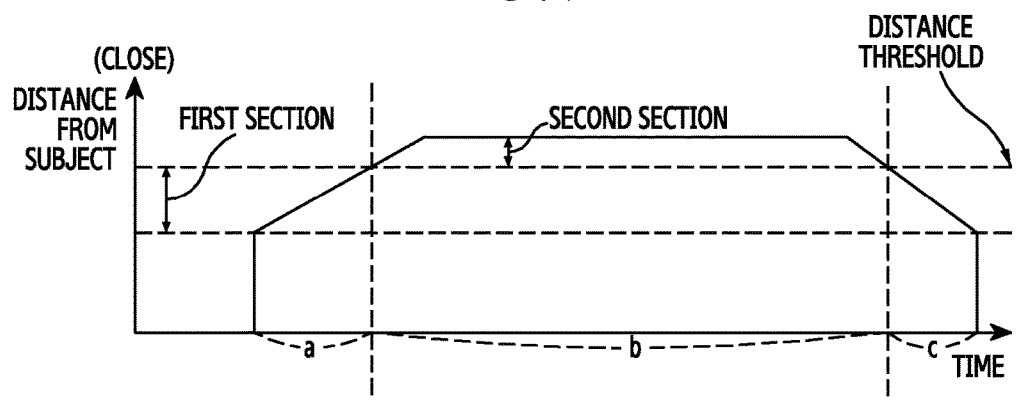
Figure 7C:
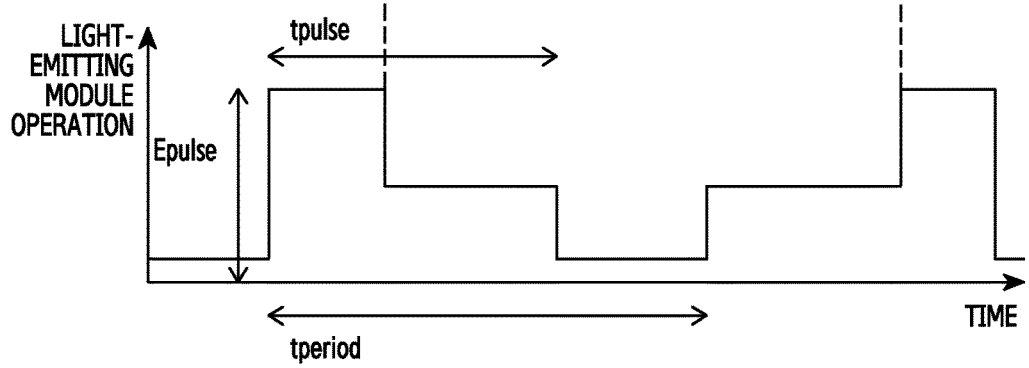

FIGS. 7A, 7B and 7C illustrate operations of a light-emitting module depending on a distance of a subject according to embodiments of the present invention. The operation of a light-emitting module included in an electronic device is determined according to a relative distance between the electronic device and a subject.

FIG. 7A illustrates a graph representing a photographing operation of a camera module. In FIG. 7A, a camera module included in an electronic device acquires an image of a subject according to a configured image acquisition period (team). The camera module acquires an image of a photographed subject by photographing the image in each exposure time interval of the camera module in the configured image acquisition period (team).

FIG. 7B illustrates a graph representing a relative distance between the electronic device and a subject and FIG. 7C illustrates a graph in which an operation of a light-emitting module is changed according to a relative distance between the electronic device and a subject (an iris). It is noted in FIGS. 7B and 7C in a time sequence that, when the electronic device and the subject (iris) are close to each other such that a relative distance therebetween has the same value as a positive slope in the first section during time interval (a), the intensity (Epulse) of a light source has a configured value (maximum value).

As shown in a time sequence in FIGS. 7B and 7C, when the electronic device and the subject (iris) are close to each other such that the relative distance therebetween is within a distance threshold (having a value up to a boundary point where the first section meets a second section), the electronic device decreases the intensity (Epulse) of the light source of the light-emitting module to satisfy a configured safety standard. According to an embodiment, since the electronic device and the subject (iris) are close to each other such that the relative distance therebetween is within the distance threshold (having the value up to the boundary point where the first section meets the second section) in the second section during time interval (b), the electronic device decreases the intensity (Epulse) of the light source of the light-emitting module to enable the configured safety standard to be satisfied within a light-emitting time interval (tpulse) of the light-emitting module.

As shown in a time sequence in FIGS. 7B and 7C, when the electronic device and the subject (iris) diverge from each other such that the relative distance therebetween increases beyond the distance threshold (having the value up to the boundary point where the first section meets the second section), the electronic device re-increases the intensity (Epulse) of the light source of the light-emitting module to a configured maximum value within a range in which a configured safety standard is satisfied. Since the electronic device and the subject (iris) diverge from each other so that the relative distance therebetween increases beyond the distance threshold in the first section during time interval (c), the electronic device re-increases the intensity (Epulse) of the light source to satisfy the configured safety standard within the light-emitting time interval (tpulse) of the light-emitting module.

Figure 8A:
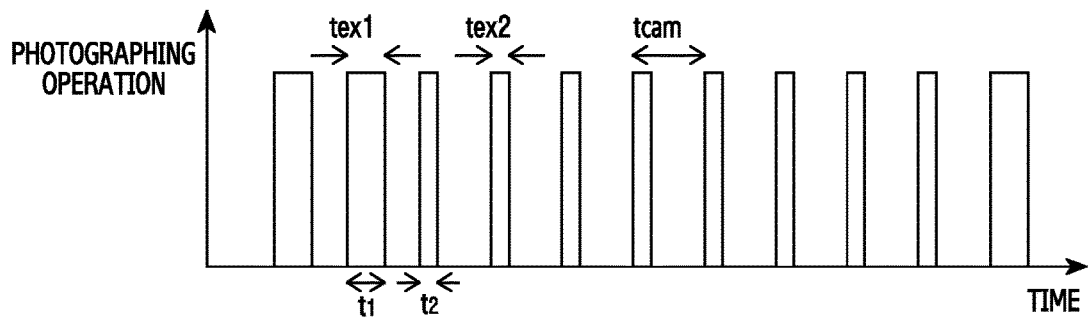
FIGS. 8A, 8B and 8C illustrate operations of a light-emitting module depending on an image acquisition period and a motion degree of an electronic device according to embodiments of the present invention.
Figure 8B:
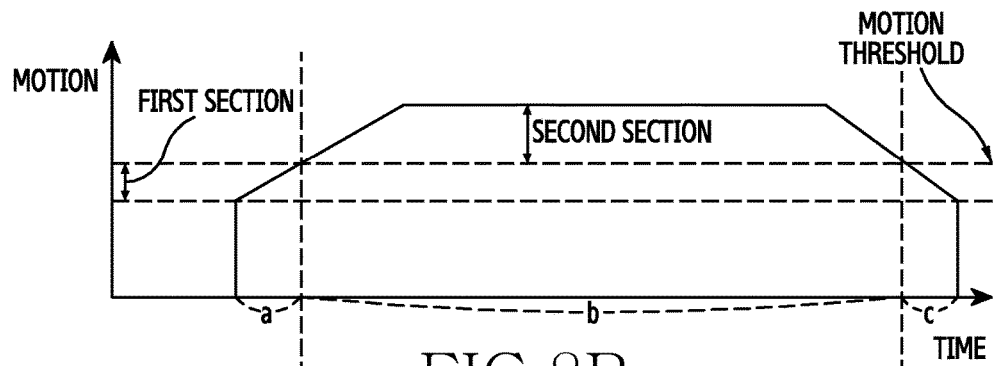
Figure 8C:
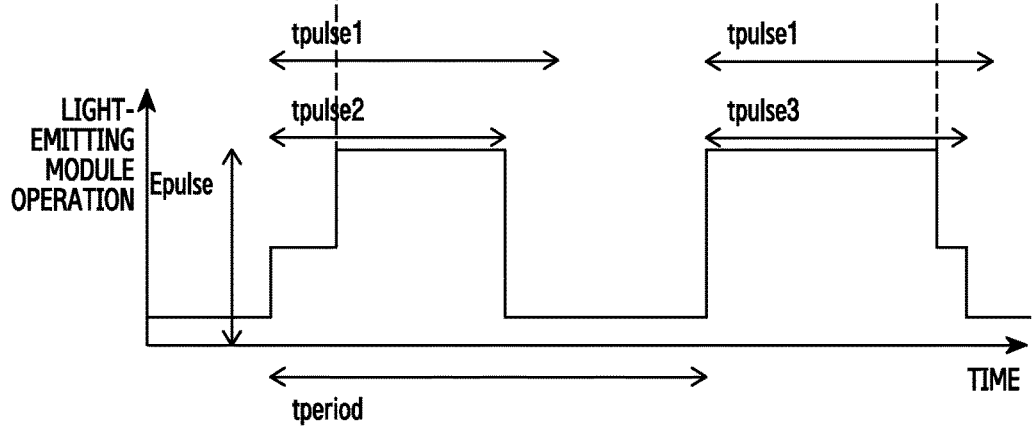

FIGS. 8A, 8B and 8C illustrate operations of a light-emitting module depending on an image acquisition period and a motion degree of an electronic device according to embodiments of the present invention.

A light-emitting module included in an electronic device reduces an image acquisition period of a camera module or an exposure time interval of the camera module while changing an operation according to a motion degree of the electronic device.

As shown in FIGS. 8A to 8C, since the motion of the electronic device is less than a motion threshold in the first section during time interval (a), intensity (Epulse) of a light source and an image acquisition period (team) of a camera module are operated according to a configured intensity of a light source and a configured image acquisition period.

When the motion of the electronic device is greater than or equal to the motion threshold, the intensity (Epulse) of the light source and the image acquisition period (team) of the camera module in the electronic device are respectively changed. As shown in FIGS. 8A to 8C, since the motion of the electronic device is greater than or equal to the motion threshold in the second section during time interval (b), the image acquisition period (team) is changed by changing a camera exposure time interval of the camera module from t1 to t2, and the intensity (Epulse) of the light source of the light-emitting module increases.

When the intensity of the light source or an average value of light-emitting energy exceeds a configured safety standard as the electronic device increases the intensity of the light source of the light-emitting module and decreases the exposure time interval of the camera module, the electronic device adjusts the intensity of the light source or a light-emitting time interval of the light-emitting module to be less than or equal to a configured standard. As shown in FIG. 8C, when the intensity (Epulse) of the light source exceeds the configured safety standard as the electronic device increases the intensity (Epulse) of the light source of the light-emitting module, the electronic device decreases the light-emitting time interval of the light-emitting module from tpulse 1 to tpulse 2.

When the motion of the electronic device decreases from a value greater than or equal to a motion threshold to a value less than the motion threshold, the intensity of the light source and the image acquisition period of the camera module in the electronic device are respectively changed. As shown in FIGS. 8A to 8C, since the motion of the electronic device decreases from the value greater than or equal to the motion threshold to a value less than the motion threshold in the first section during time interval (c), the image acquisition period (team) is changed by changing a camera exposure time interval of the camera module from t1 to t2, and the intensity (Epulse) of the light source of the light-emitting module increases. When the motion of the electronic device decreases from the value greater than or equal to the motion threshold to a value less than the motion threshold, the electronic device changes the light-emitting time interval of the light-emitting module from tpulse 2 to tpulse 1.

Figure 9A:
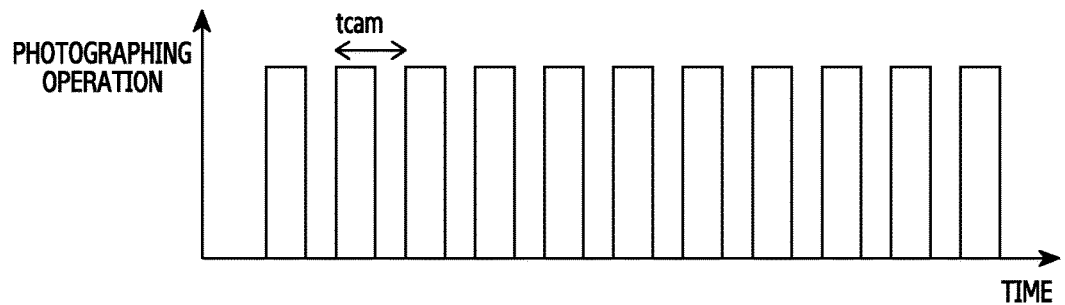
FIGS. 9A, 9B and 9C illustrate operations of a light-emitting module depending on a motion degree of an electronic device according to embodiments of the present invention.
Figure 9B:
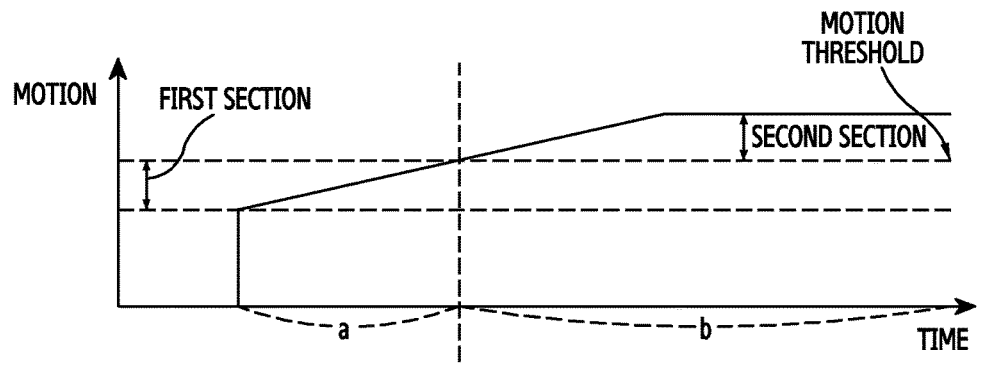
Figure 9C:
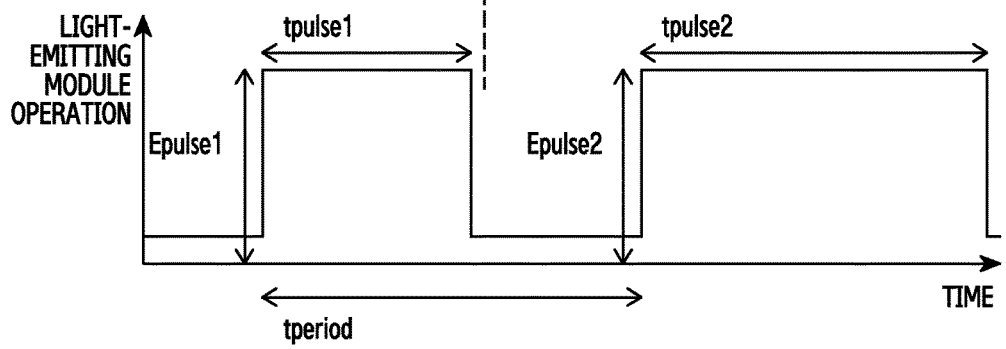

FIGS. 9A, 9B and 9C illustrate operations of a light-emitting module depending on a motion degree of an electronic device according to embodiments of the present invention. The light-emitting module included in an electronic device changes an operation depending on a motion degree of the electronic device when an image acquisition period of a camera module is constant.

As shown in FIGS. 9B and 9C, since the motion of the electronic device is less than the motion threshold in the first section during time interval (a), intensity (Epulse) of a light source and a light-emitting time interval (tpulse1) are performed according to a configured intensity of a light source and a configured light-emitting time interval.

When the motion of the electronic device is greater than or equal to the motion threshold when the image acquisition period of the camera module is constant, the electronic device places a weight on the light-emitting time interval.

As shown in FIGS. 9B and 9C, since the motion of the electronic device is greater than or equal to the motion threshold in the second section during time interval (b) when the image acquisition period of the camera module is constant, a light-emitting time interval (tpulse2) is greater than the light-emitting time interval (tpulse1) of when the motion of the electronic device is less than the motion threshold, when intensities (Epulse2=Epulse1) of the light sources are identical.

Figure 10:
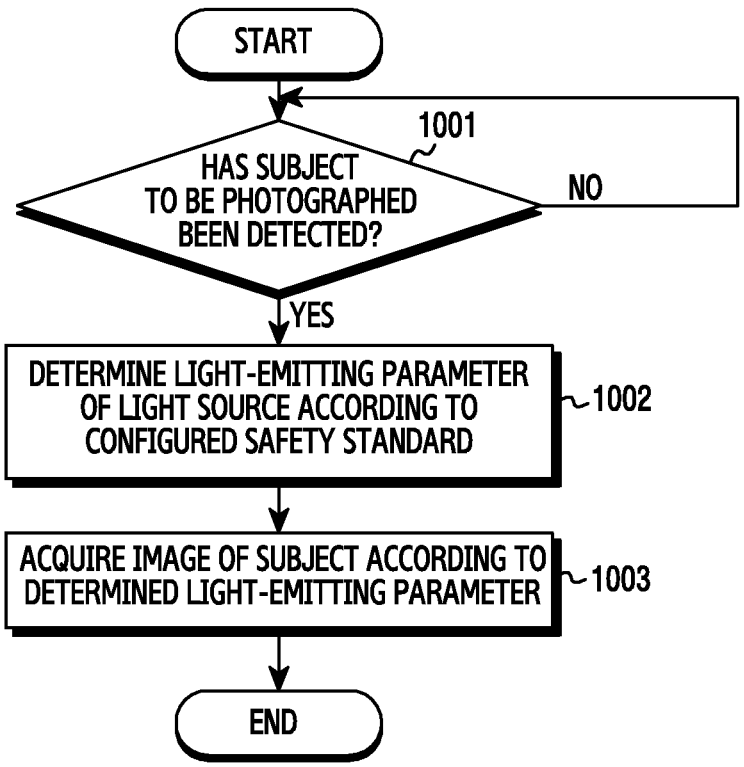
FIG. 10 is a flowchart illustrating an operating sequence of an electronic device according to embodiments of the present invention.

FIG. 10 is a flowchart illustrating an operating sequence of an electronic device according to embodiments of the present invention. As shown in FIG. 10, an electronic device determines whether a subject to be photographed has been detected in step 1001. For example, the electronic device determines whether an iris which is the subject to be photographed has been detected through a camera module included in the electronic device.

In step 1002, when the subject to be photographed has been detected in the electronic device, the electronic device determines a light-emitting parameter of a light source according to a configured safety standard. The light-emitting parameter may be at least one among a distance to the iris, emitting light-emitting intensity, a light-emitting time, the number of instances of light-emitting, a motion degree, and an exposure time of a camera module. When the light-emitting parameter of the light-emitting module is determined in the electronic device, the electronic device is determined to be within the configured safety standard.

In step 1003, the electronic device acquires an image of the subject according to the determined light-emitting parameter. The electronic device determines the light-emitting parameter depending on at least one among the distance to the iris, the light-emitting intensity, the light-emitting time, the number of instances of light-emitting, the motion degree, and the exposure time of a camera module, and then acquires an image of the subject depending on the determined light-emitting parameter. When the image of the subject has been acquired in the electronic device, the electronic device releases a locking configuration screen and performs a configured user authentication.

Figure 11:
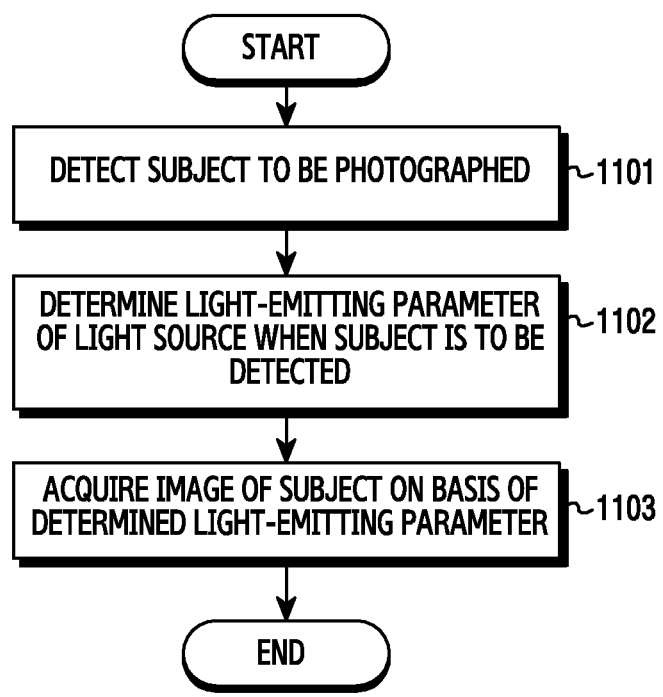
FIG. 11 is a flowchart illustrating a method of an electronic device according to embodiments of the present invention.

FIG. 11 is a flowchart illustrating a method of an electronic device according to embodiments of the present invention. As shown in FIG. 11, an electronic device determines whether a subject to be photographed has been detected in step 1101. For example, the electronic device detects an iris which is a subject to be photographed through a camera module included in the electronic device.

In step 1102, when the subject has been detected in the electronic device, the electronic device determines a light-emitting parameter of a light source. For example, the electronic device determines the light-emitting parameter which is determined according to at least one among a distance to a subject (an iris), emitting light-emitting intensity, a light-emitting time, the number of instances of light-emitting, a motion degree, and an exposure time of a camera module.

In step 1103, the electronic device acquires an image of the subject based on the determined light-emitting parameter. The electronic device determines the light-emitting parameter depending on at least one among the distance to the subject (the iris), the light-emitting intensity, the light-emitting time, the number of instances of light-emitting, the motion degree, and the exposure time of a camera module, and then acquires an image of the subject depending on the determined light-emitting parameter.

According to embodiments of the present invention, an operation method of the electronic device includes detecting a subject to be photographed, determining the light-emitting parameter of the light source when the subject is to be detected, and acquiring an image of the subject based on the determined light-emitting parameter.

The light-emitting parameter is determined according at least one among the distance to the subject, the light-emitting intensity, the light-emitting time interval, the number of instances of light-emitting, the motion degree, and the exposure time of a camera module.

When determining the light-emitting parameter of the light source, the light-emitting parameter is determined within the configured safety standard according to Equation (1) above.

When determining the light-emitting parameter of the light source, the light-emitting parameter increases a light-emitting intensity as a configured light-emitting intensity according to the configured safety standard when it is determined that a distance to the subject is within a range from a first distance to the second distance and decreases the light-emitting intensity as the configured light-emitting intensity according to the safety standard when it is determined that the distance to the subject is within a range from the second distance to the first distance.

When determining the light-emitting parameter of the light source, the light-emitting parameter increases a light-emitting intensity and a light-emitting time interval as a configured light-emitting intensity and a configured light-emitting time interval, respectively, when a second motion degree has been detected in a first motion degree, and decreases the light-emitting intensity and the light-emitting time interval as a configured light-emitting intensity and a configured light-emitting time interval, respectively, when the first motion degree has been detected in the second motion degree.

When determining the light-emitting parameter of the light source, the light-emitting parameter increases a light-emitting intensity and a light-emitting time to a configured light-emitting intensity and a configured light-emitting time interval, respectively, when an exposure time interval of the camera module decreases to a configured time interval, when a second motion degree has been detected in a first motion degree, and decreases the light-emitting intensity and the light-emitting time interval to a configured light-emitting intensity and a configured light-emitting time interval, respectively, when an exposure time interval of the camera module decreases to a configured time interval, when the first motion degree has been detected in the second motion degree.

Determining the light-emitting parameter of the light source includes decreasing the light-emitting intensity to the configured light-emitting intensity when a detected brightness is greater than or equal to a configured brightness, and increasing the light-emitting intensity to configured light-emitting intensity when the detected brightness is less than the configured brightness.

When determining the light-emitting parameter of the light source, the light-emitting time interval may include an image photographing period of two or more frames.

The subject includes an iris.

According to various embodiments, since the light-emitting parameter of the light source is determined to meet the configured safety standard when the subject is desired to be photographed, a user's safety is enhanced.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. An operation method of an electronic device, the method comprising:

detecting a subject;
determining a light-emitting parameter of a light source when the subject is detected; and
acquiring an image of the subject based on the determined light-emitting parameter,
wherein the light-emitting parameter of the light source is determined based on at least one of a motion degree of the electronic device and an image acquisition period of a camera, and
wherein, if the light-emitting parameter of the light source is determined based on the image acquisition period, at least one of a light-emitting intensity and a light-emitting time interval of the light source decreases according to an increase of the image acquisition period.

2. The method of claim 1, wherein the light-emitting parameter of the light source includes at least one among the light-emitting intensity, the light-emitting time interval, and a number of instances of light-emitting.

3. The method of claim 1, wherein the light-emitting parameter is determined within a configured safety limit.

4. The method of claim 3, wherein the safety limit is determined according to the following Equation:

$$E_{avg} = E_{pulse} D = E_{pulse} \frac{t_{pulse}}{t_{period}}$$

wherein, Epulse refers to a peak value of a light-emitting energy, D refers to a duty cycle, tpulse refers to a light-emitting time interval, tperiod refers to a light-emitting period, and D has a value between 0 and 1.

5. The method of claim 1, wherein determining the light-emitting parameter of the light source further comprises:
decreasing the light-emitting intensity to a configured light-emitting intensity according to a configured safety limit when determining that a distance to the subject is within a predetermined standard distance; and
increasing the light-emitting intensity to the configured light-emitting intensity according to the safety limit when determining that the distance to the subject is greater than the predetermined standard distance.

6. The method of claim 1, wherein determining the light-emitting parameter of the light source further comprises:
increasing the light-emitting intensity and the light-emitting time interval to a configured light-emitting intensity and a configured light-emitting time interval, respectively, when the motion degree of the electronic device is greater than or equal to a predetermined motion degree; and
decreasing the light-emitting intensity and the light-emitting time interval to the configured light-emitting intensity and the configured light-emitting time interval, respectively, when the motion degree of the electronic device is less than the predetermined motion degree.

7. The method of claim 1, wherein determining the light-emitting parameter of the light source further comprises:
increasing the light-emitting intensity and the light-emitting time interval to a configured light-emitting intensity and the configured light-emitting time interval, respectively, when an exposure time interval of the camera is decreased to a configured time interval, and when the motion degree of the electronic device is greater than or equal to a predetermined motion degree; and decreasing the light-emitting intensity and the light-emitting time interval to the configured light-emitting intensity and the configured light-emitting time interval, respectively, when an exposure time interval of the camera is decreased to a configured time interval, and when the motion degree of the electronic device is less than the predetermined motion degree.

8. The method of claim 1, wherein determining the light-emitting parameter of the light source further comprises:

decreasing the light-emitting intensity to a configured light-emitting intensity when a detected brightness is greater than or equal to a configured brightness; and increasing the light-emitting intensity to the configured light-emitting intensity when a detected brightness is less than a configured brightness.

9. The method of claim 1, wherein the subject comprises an iris.

10. An electronic device, comprising:

a camera;

a light source; and a processor configured to:

detect a subject from the camera;

determine a light-emitting parameter of the light source when the subject is detected; and acquire an image of the subject based on the determined light-emitting parameter, wherein the light-emitting parameter of the light source is determined based on at least one of a motion degree of the electronic device and an image acquisition period of the camera, and wherein, if the light-emitting parameter of the light source is determined based on the image acquisition period, at least one of a light-emitting intensity and a light-emitting time interval of the light source decreases according to an increase of the image acquisition period.

11. The electronic device of claim 10, wherein the light-emitting parameter includes at least one among the light-emitting intensity, the light-emitting time interval, and the number of instances of light-emitting.

12. The electronic device of claim 10, wherein the processor determines the light-emitting parameter within a configured safety limit.

13. The electronic device of claim 12, wherein the safety limit is determined according to the following Equation:

$$E_{avg} = E_{pulse}D = E_{pulse}\frac{t_{pulse}}{t_{period}}$$

wherein, Epulse refers to a peak value of a light-emitting energy, D refers to a duty cycle, tpulse refers to a light-emitting time interval, tperiod refers to a light-emitting period, and D has a value between 0 and 1.

14. The electronic device of claim 10, wherein the processor is further configured to decrease the light-emitting intensity to a configured light-emitting intensity according to a configured safety limit when determining that a distance to the subject is within a predetermined standard distance, and increase the light-emitting intensity to the configured light-emitting intensity according to the safety limit when determining that the distance to the subject is greater than a preconfigured standard distance.

15. The electronic device of claim 10, wherein the processor is further configured to increase the light-emitting intensity and the light-emitting time interval to a configured light-emitting intensity and a configured light-emitting time interval, respectively, when the motion degree of the electronic device is greater than or equal to a predetermined motion degree, and decrease the light-emitting intensity and the light-emitting time interval to the configured light-emitting intensity and the configured light-emitting time interval, respectively, when the motion degree of the electronic device is less than the predetermined motion degree.

16. The electronic device of claim 10, wherein the processor is further configured to increase the light-emitting intensity and the light-emitting time interval to a configured light-emitting intensity and a configured light-emitting time interval, respectively, when an exposure time interval of the camera is decreased to a configured time interval, and when the motion degree of the electronic device is greater than or equal to a predetermined motion degree, and decrease the light-emitting intensity and the light-emitting time interval to the configured light-emitting intensity and the configured light-emitting time interval, respectively, when an exposure time interval of the camera is decreased to the configured time interval, and when the motion degree of the electronic device is less than the predetermined motion degree.

17. The electronic device of claim 10, wherein the processor further configured to decrease the light-emitting intensity to a configured light-emitting intensity when a detected brightness is greater than or equal to a configured brightness, and increase the light-emitting intensity to the configured light-emitting intensity when the detected brightness is less than the configured brightness.

18. The electronic device of claim 10, wherein the subject comprises an iris.

* * * * *